United States Patent [19]

Hench et al.

[11] Patent Number: 5,196,382

[45] Date of Patent: Mar. 23, 1993

[54] METHOD FOR RAPID PRODUCTION OF LARGE SOL-GEL $SiO_2$ CONTAINING MONOLITHS OF SILICA WITH AND WITHOUT TRANSITION METALS

[75] Inventors: Larry L. Hench; Shi-Ho Wang, both of Gainesville, Fla.

[73] Assignee: University of Florida Research Foundation, Inc., Gainesville, Fla.

[21] Appl. No.: 568,619

[22] Filed: Aug. 16, 1990

Related U.S. Application Data

[63] Continuation of Ser. No. 372,192, Jun. 26, 1989, abandoned, which is a continuation of Ser. No. 704,938, Feb. 25, 1985, abandoned.

[51] Int. Cl.$^5$ .......................... B01J 13/00; C03C 3/00; C03C 3/078
[52] U.S. Cl. ................................. 501/12; 252/315.01; 252/315.6; 252/582; 501/72
[58] Field of Search ......................... 252/315.01, 315.6; 501/12, 72

[56] References Cited

U.S. PATENT DOCUMENTS

| | | | |
|---|---|---|---|
| 2,281,810 | 5/1942 | Stone et al. | 252/315.6 X |
| 3,148,073 | 9/1964 | Smith et al. | 501/72 |
| 3,640,093 | 2/1972 | Levene et al. | 501/12 X |
| 4,286,024 | 8/1981 | Yoldas | 428/446 |

OTHER PUBLICATIONS

*The Chemistry Of Carboxylic Acids And Esters*, Edited By S. Patai, Interscience Publishers, (1969), p. 597.

*Primary Examiner*—Richard D. Lovering

[57] ABSTRACT

A process for producing sol-gel monoliths containing $SiO_2$ by mixing water, a $SiO_2$ precursor and ketomalonic acid to form a sol, gelling the sol, aging the gelled sol and drying the aged gelled sol. Optional additional ingredients that may be added in the mixing step include salts of non-precipitating transition metals such as copper and/or additional precursors such as precursors for $B_2O_3$, $Na_2O$, $Li_2O$, $TiO_2$, $Al_2O_3$ or mixtures thereof.

6 Claims, No Drawings

METHOD FOR RAPID PRODUCTION OF LARGE SOL-GEL SIO2 CONTAINING MONOLITHS OF SILICA WITH AND WITHOUT TRANSITION METALS

This invention was made with Government support under F49620-83-C-0072 awarded by the Air Force. The Government has certain rights in this invention.

This application is a continuation of application Ser. No. 372,192, filed Jun. 26, 1989, now abandoned, which is a continuation of application Ser. No. 704,938, filed Feb. 25, 1985, now abandoned.

BACKGROUND OF THE INVENTION

This invention relates to a novel method for producing large sol-gel derived $SiO_2$ containing monoliths which may incorporate copper homogeneously therein on substantially a molecular basis and products obtained by the practice of the novel method.

DESCRIPTION OF THE PRIOR ART

Previous developments, see copending applications applications Ser. Nos. 583,741; 583,742; and 583,744 filed Feb. 27, 1983, said Ser. No. 583,741, having matured into U.S. Pat. No. 4,851,150, and said Ser. No. 588,742 and said Ser. No. 583,744 both having been abandoned, have shown how to produce rapidly large optically transparent $SiO_2$ containing monoliths of $SiO_2$, $Li_2O$—$SiO_2$, $Na_2O$—$SiO_2$,
$Al_2O_3$—$B_2O_3$—$SiO_2$, $Al_2O_3$—$SiO_2$,
$Li_2O$—$Al_2O_3$—$SiO_2$, $Li_2O$—$Al_2O_3$—$TiO_2$—$SiO_2$ using special drying control chemical additives. The present invention is the result of research which has resulted in the development of a new method that uses ketomalonic acid, as an additive, to produce rapidly transparent monolithic $SiO_2$ containing gels that may include a transition metal dopant, such as copper. The invention also includes the unique products made by the novel methods. The molecular formula of the new additive is [HOOCC2(OH)2COOH], and is shown schematically as:

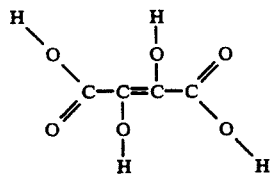

The molecular weight of the ketomalonic acid is 136.06 g/mole.

SUMMARY OF THE INVENTION

Use of ketomalonic acid in the sol-gel glass systems makes it possible to make optically transparent $SiO_2$ containing amorphous monoliths rapidly and without (i) precipitation, (ii) formation of an inhomogeneous gel, or (iii) crystallization. The novel method of the present invention makes it possible to produce novel noncrystalline (amorphous) homogeneous optical filter silica containing gels and glasses of variable indices of refraction rapidly and routinely with or without a wide variety of transition metal optical absorption bands.

It is already known that copper ions cannot be introduced easily into a silica containing sol. By the present invention, however, it has been discovered, that copper ions can be introduced into a silica containing sol by use of ketomalonic acid and that one can obtain a monolithic homogeneous, $SiO_2$ containing transparent blue amorphous gel. Accordingly, by the practice of the present invention one can make a new kind of filter with variable ranges of indices of refraction and specific optical absorption bands.

DESCRIPTION OF THE INVENTION

In order to achieve the objects and advantages of the present invention, a unique method is provided. The general process contemplates six steps comprising: 1) mixing, 2) casting, 3) gelation, 4) aging, 5) drying, and 6) densification. The first step, mixing, involves mixing from 0.01 mole to 0.1 mole ketomalonic acid additive with from 10–25 moles of distilled water (16 moles is preferred) for 1–20 minutes (5 minutes is preferred) at 0°–50° C. (room temperature is preferred) followed by adding to the solution 0.5–2.5 moles of a $SiO_2$ precursor such as tetramethoxysilane (TMS) (1 mole is preferred) and mixing for an additional 1–20 minutes (5 minutes is preferred). Any $SiO_2$ precursor can be used alone or in combination with one or more $B_2O_3$, $Na_2O$, $Li_2O$, $TiO_2$ and $Al_2O_3$ precursors as disclosed in said aforementioned copending applications here incorporated by reference. Next, a concentration range from 0.001 mole to 0.5 moles of transition metal, more particularly, copper in the form of acetate (TMAc), is added to the ketomalonic acid-TMS solution keeping the ratio of TMAc to ketomalonic acid less than 1.0 to avoid a precipitate forming. The molar concentration of the transition metal, particularly copper is selected to produce a required or desired intensity of optical absorption in the resulting gel-glass. The transition metal is added to the solution during the 20–80 minutes of mixing while increasing the temperature to 60°–85° C. to accelerate hydrolysis of the silica precursor, e.g. TMS, while incorporating the transition metal (Cu) ions homogeneously into the silica sol network as it is being formed. Any salt of copper may be used that will enter into the sol and remain to gelation without precipitating out and can be decomposed by heat to metallic copper or copper oxide.

In the second step, casting, the thoroughly mixed homogeneous silica solution is cooled to about 60° C. or less and then cast into molds to form the required shape of the desired optical component. The molds are immediately covered and sealed. The covered molds are maintained at 60° C. or lower until gelation occurs (Step 3), (gelation time increases with lower temperature) and for an additional one hour after gelation. Then the molds are heated to 85° C. for approximately 10–30 hours (15 hours being preferred) to age the gels (Step 4) and increase their strength and density. The drying procedures (Step 5) follow as previously described in the aforementioned copending applications, namely, heating to from 100° C. to 200° C. for from 18 to 96 hours. Finally, (Step 6), densification is achieved by firing in ambient atmosphere between 500°–1350° C. for one to three days depending on the concentration of the transition metal and the density required.

A specific example follows for adding the transition metal Cu to a silica gel glass.

EXAMPLE 1

5.00 g ketomalonic acid is added to 300 cc of distilled water at room temperature and mixed for 5 minutes with a magnetic stirrer. To the above solution is added 150 cc of TMS at room temperature while continuing to mix for 5 minutes. To the ketomalonic acid-TMS-H₂O solution is added 3.50 g of copper acetate monohydrate (TMAc) while mixing and simultaneously increasing the solution temperature to 85° C. for a period of no more than 35 minutes. The intimately mixed TMAc-TMS-H₂O sol is cast from its heated vessel into a mold of a shape that corresponds to the desired final object. The mold material is polystyrene but typically may be polyethylene, polystyrene, or PTFE (polytetrafluorethylene). The length of time for casting or mold filling is about 20 minutes but can be up to 110 minutes. The filled mold is covered and its temperature is reduced to 60° C. prior to gelation. Gelation occurs in the mold at 60° C. within about 115 minutes with the solid object resulting taking the shape of and surface finish of the mold. The solid is aged in the mold initially at 60° C. for 10 hours followed by an increase to 95° C. for 15 hours. The aged copper-silica gel is removed from the mold and dried initially at 100° C. with a gradual increase to 200° C. over 96 hours in a container with a loose cover. The fully dried copper-silica gel is then heated up to 500° C. to eliminate residual organics. The copper colored silica optical component resulting is transparent but colored blue by the copper addition and has a BET surface area of 800 m²/g and a density of 1.3 to 1.4 g/cc. Additional densification can be achieved by heating from about 500° C. to about 1350° C. resulting in a transparent optical object that is blue in color.

The following example uses ketomalonic acid without adding a transition metal, i.e., pure $SiO_2$ is obtained.

EXAMPLE 2

6.00 g ketomalonic acid are added to 300 cc of distilled water at room temperature and mixed for 5 minutes with magnetic stirrer. To the above solution is added 150 cc of TMS (tetramethyloxysilane at room temperature while mixing for 5 minutes and simultaneously increasing the solution temperature to 85° C. for a period 30 minutes. The intimately mixed ketomalonic acid-TMS-H₂O sol is cast from its heated vessel into a mold of a shape that corresponds to the desired final object. The mold material is polystyrene but typically can be polyethylene, polystyrene, or PTFE (polytetrafluorethylene). The length of time for casting or mold filling is 25 minutes but can be up to 110 minutes. The filled mold is covered and its temperature is reduced to 60° C. prior to gelation. Gelation occurs in the mold at 60° C. within about 115 minutes with the solid object resulting taking the shape of and surface finish of the mold. The solid $SiO_2$ gel is aged in the mold initially at 60° C. for 10 hours followed by an increase to 95° C. for 15 hours. The aged pure silica gel is removed from the mold and dried initially at 100° C. with a gradual increase to 200° C. over 96 hours in a container with a loose cover. The fully dried pure silica gel is then heated up to 500° C. to eliminate residual organics. The optical component resulting is transparent with a BET surface area of 800 m²/g and a density of 1.3 to 1.4 g/cc. Additional densification can be achieved by heating from about 500° C. to about 1350° C. resulting in a colorless, transparent optical object.

Having now fully described the invention, it will be apparent to any one of ordinary skill in the art that many changes and modifications can be made thereto without departing from the spirit and scope of the invention as set forth herein.

What is claimed is:

1. A process for producing sol-gel monoliths containing $SiO_2$ comprising the steps of:
    a. mixing water, a $SiO_2$ precursor and ketomalonic acid to form a sol,
    b. gelling the sol,
    c. aging the gelled sol, and
    d. drying the aged gelled sol,
wherein the constituents are present in the ratio 10–25 moles of water, 0.5–2.5 moles $SiO_2$ precursor and 0.01–0.1 moles ketomalonic acid.

2. A process according to claim 1 wherein the mixing step includes the addition of a non precipitating salt of a transition metal.

3. A process according to claim 2 wherein the transition metal is copper.

4. A process according to claim 2 wherein the ratio of salt of a transition metal to ketomalonic acid is less than 1.0.

5. A process according to claim 1 wherein the dried aged gelled sol is densified by heating to from about 500° C. to about 1350° C.

6. A process according to claim 1 wherein the mixing step includes the addition of a precursor selected from the group consisting of precursors of $B_2O_3$, $Na_2O$, $Li_2O$, $TiO_2$, $Al_2O_3$ and mixtures thereof.

* * * * *